United States Patent [19]

Horiuchi et al.

[11] Patent Number: 5,109,161
[45] Date of Patent: Apr. 28, 1992

[54] LIGHT EMITTER AND OPTICAL SYSTEM FOR A DISTANCE MEASURING DEVICE

[75] Inventors: Akihisa Horiuchi; Youichi Iwasaki, both of Kanagawa, Japan

[73] Assignee: Canon Kabushiki Kaisha, Tokyo, Japan

[21] Appl. No.: 594,955

[22] Filed: Oct. 10, 1990

[30] Foreign Application Priority Data

Oct. 14, 1989 [JP] Japan ................................ 1-267516

[51] Int. Cl.[5] ............................................ G01N 21/86
[52] U.S. Cl. ................................. 250/561; 250/201.6; 356/1; 354/403
[58] Field of Search ..................... 250/201.6, 216, 561; 250/201.4; 350/424; 356/1, 4, 141, 152; 354/403

[56] References Cited

U.S. PATENT DOCUMENTS

| | | |
|---|---|---|
| 3,434,785 | 3/1969 | Weber ................................... 356/1 |
| 4,371,261 | 2/1983 | Tsuji . | |
| 4,575,211 | 3/1986 | Matsumura et al. . | |
| 4,748,469 | 5/1988 | Tamura ................................ 354/403 |
| 4,897,536 | 1/1990 | Miyoshi ............................... 250/561 |
| 5,004,902 | 4/1991 | Matsui et al. ........................ 250/216 |

FOREIGN PATENT DOCUMENTS 56-57012  5/1981  Japan .

*Primary Examiner*—David C. Nelms
*Attorney, Agent, or Firm*—Fitzpatrick, Cella, Harper & Scinto

[57] ABSTRACT

In an optical system arranged to detect a distance to an object to be photographed by projecting beams of light from a light emitting element which emits visible light or infrared rays or the like and by receiving reflected light from the object at a light receiving element, a light projecting lens system having a plurality of optical axes is arranged in front of the light emitting element to have a spherical or aspherical surface on the side of the object and a plurality of planes for forming the plurality of optical axes on the side of the light emitting element.

10 Claims, 4 Drawing Sheets

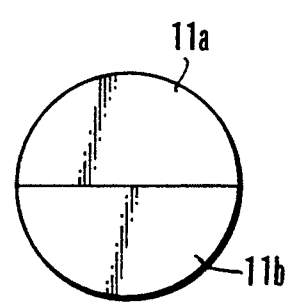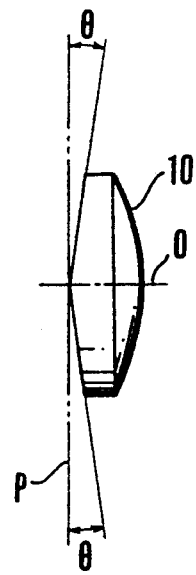
FIG.2(A)
FIG.2(B)
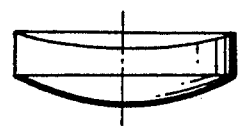
FIG.2(C)
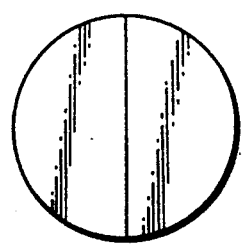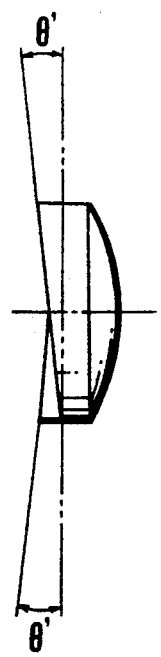
FIG.3(A)
FIG.3(B)
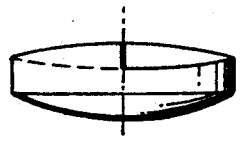
FIG.3(C)

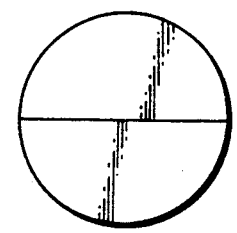
FIG.4(A)
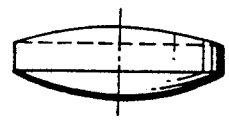
FIG.4(C)  FIG.4(B)
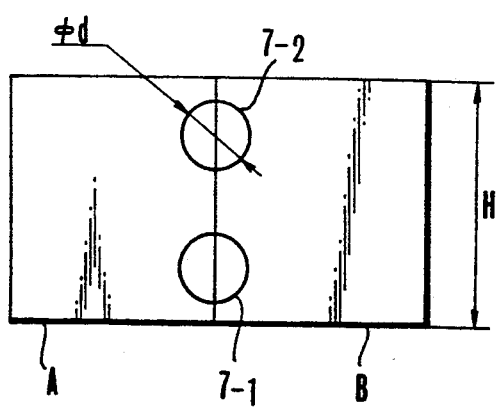
FIG.5
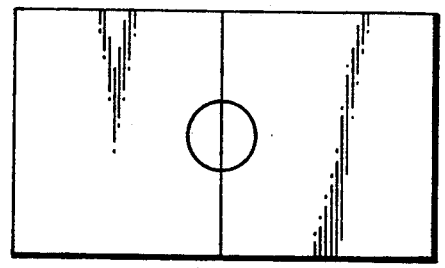
FIG.6

LIGHT EMITTER AND OPTICAL SYSTEM FOR A DISTANCE MEASURING DEVICE

BACKGROUND OF THE INVENTION

1. Field of the Invention

This invention relates to an optical system adapted for an active type focus detecting device.

2. Description of the Related Art

There have been proposed various infrared automatic focusing devices of the so-called active type having a projection light source and a light receiving element and arranged to scan a photographed object with a light beam coming from the light source, and to continuously or noncontinuously scan the image field with the light receiving element, and to adjust the focus of a photo-taking lens according to an output obtained from a reflected light thus obtained. In the distance detecting device of this kind, the so-called distance measuring visual field is determined by the size of the light source which is projected on the object by means of a light projecting lens. Further, an infrared emitting diode is generally employed as the light source. This element is small in size and is highly efficient. However, since the luminous flux of the emitted light is thin, a spot image resulting from the light projection is small. Therefore, the distance measuring visual field is narrow. This is suitable for accurate focusing on a desired object. However, in cases where there are a plurality of shooting objects spaced at some distance that might allow the spot image of the project light to pass between them, distance measurement cannot be correctly accomplished. Such a distance measuring action results in a so-called middle passing picture having the focus on the background. A method for solving this problem has been proposed, for example, by Japanese Laid-Open Patent Application No. SHO 56-57012 (U.S. Pat. No. 4,371,261). According to this method, an optical element having a plurality of optical axes is employed as the light projecting lens. A plurality of light projection spot images are thus projected on the object from a single light emitting element in such a way as to enlarge the distance measuring visual field without degrading the efficiency of the device.

The optical element which is disclosed by way of example in the above-stated patent application is composed of convex lenses which are cemented together. However, in a case where the optical element is formed by a low-cost injection molding process or the like, the precision of the parts tends to degrade.

Another method for broadening the detection zone has been disclosed in U.S. Pat. No. 4,575,211.

FIG. 7 of the accompanying drawings diagramatically shows the basic arrangement of the active type distance measuring device. Referring to FIG. 7, a light emitting element 1 which is an LED or the like emits either modulated visible rays or infrared rays. A light projecting lens 3 which has a focal length f1 is disposed in front of the light emitting element 1. A light receiving lens 4 which is of a focal length f2 is disposed a base-line length L away from the lens 3. In the rear of the light receiving lens 4 is disposed a light receiving element 2 which is, for example, of a two-area type. A beam of light emitted from the light emitting element 1 passes through the light projecting lens 3 to be projected on an object 5 and thus forms a projected light spot image 6 there. Then, rays of light reflected from the object 5 pass through the light receiving lens 4 to form on the light receiving element 2 an image resulting from the projected light spot image 6. At that moment, the light receiving element 2 is moved in synchronism with adjustment of the focus of a photo-taking lens, which is not shown, in such a way as to make the electrical outputs from two areas of the light receiving element 2 equal to each other. Then, a distance R to the object is detected from a light receiving element moving degree x in accordance with the following formula:

$R = L \cdot f_2 / x$

In this instance, the distance measuring visual field becomes the size of the projected light spot image 6 obtained by the light projecting lens 3 of the light emitting element 1. Assuming that the size of the light emitting element 1 is 0.5 mm, the focal length f1 of the light projecting lens 3 is 30 mm and the object distance R is 3 m, the size of the projected light spot image 6 is about 50 mm. The light-projecting and light-receiving lenses 3 and 4 are focused either for an object distance selected beforehand or for an infinite distance.

SUMMARY OF THE INVENTION

It is a principal object of this invention to provide a detecting device which is arranged to facilitate the low-cost manufacture thereof and is capable of making accurate detection despite of the low cost.

It is a subordinate object of the invention to provide a detecting device wherein one side of a light projecting lens consists of a plurality of plane parts which are arranged at a mutually slanting angle.

These and other objects and features of this invention will become apparent from the following detailed description of embodiments thereof taken in conjunction with the accompanying drawings.

BRIEF DESCRIPTION OF THE DRAWINGS

FIGS. 2(A), 2(B) and 2(C) show the essential parts of the first embodiment. FIGS. 3(A), 3(B) and 3(C) show the essential parts of a second embodiment of the invention. FIGS. 4(A), 4(B) and 4(C) show the essential parts of a third embodiment of the invention. FIG. 5 shows the state of spot images 7-1 and 7-2 formed on a sensor in the embodiment shown in FIG. 1. FIG. 6 shows the state of a spot image formed on a sensor which is arranged as shown in FIG. 7.

DETAILED DESCRIPTION OF THE PREFERRED EMBODIMENTS

Figure 1:
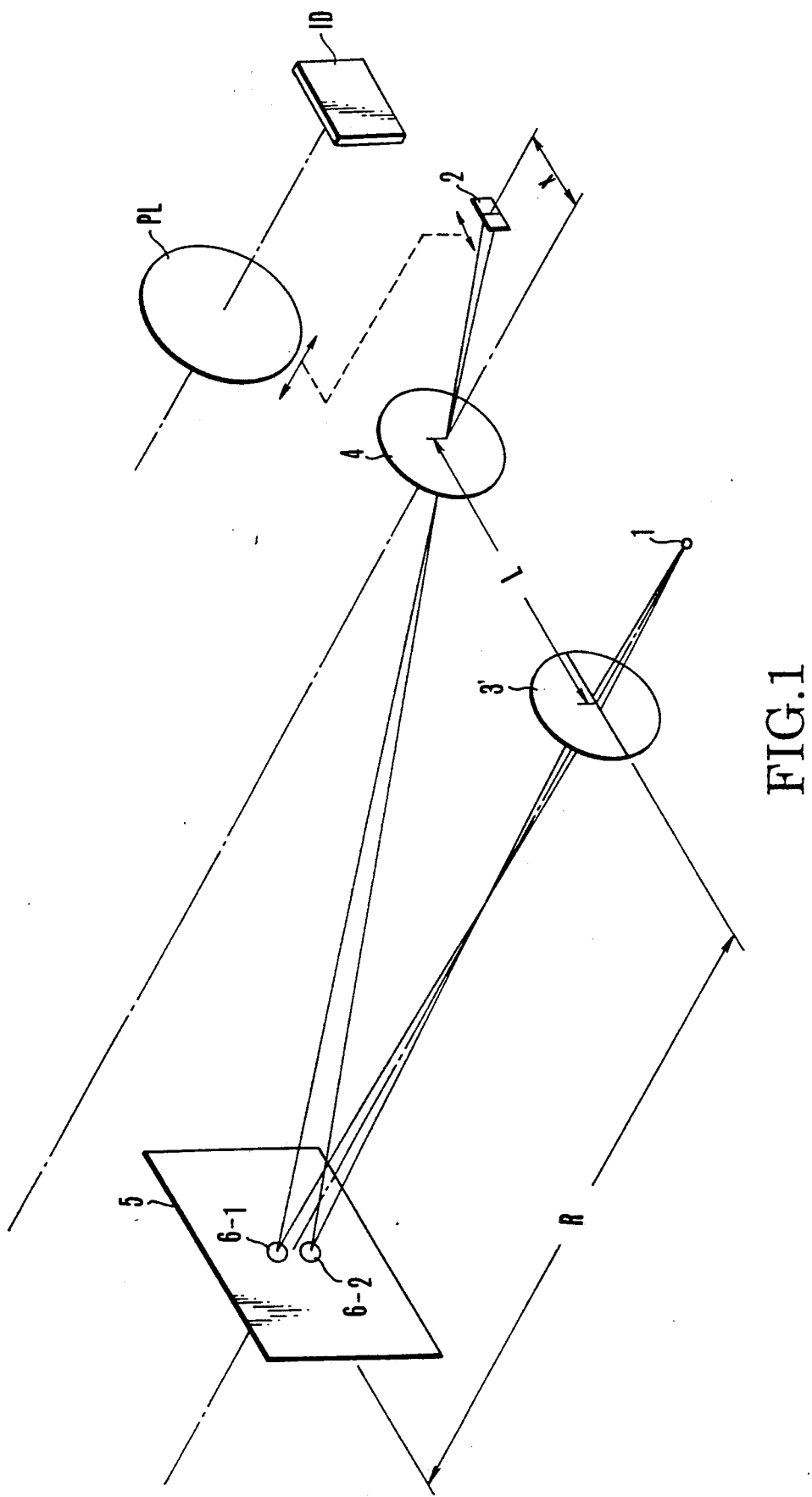
FIG. 1 is a layout view showing a first embodiment of this invention in a state of using a light projecting lens.
Figure 7:
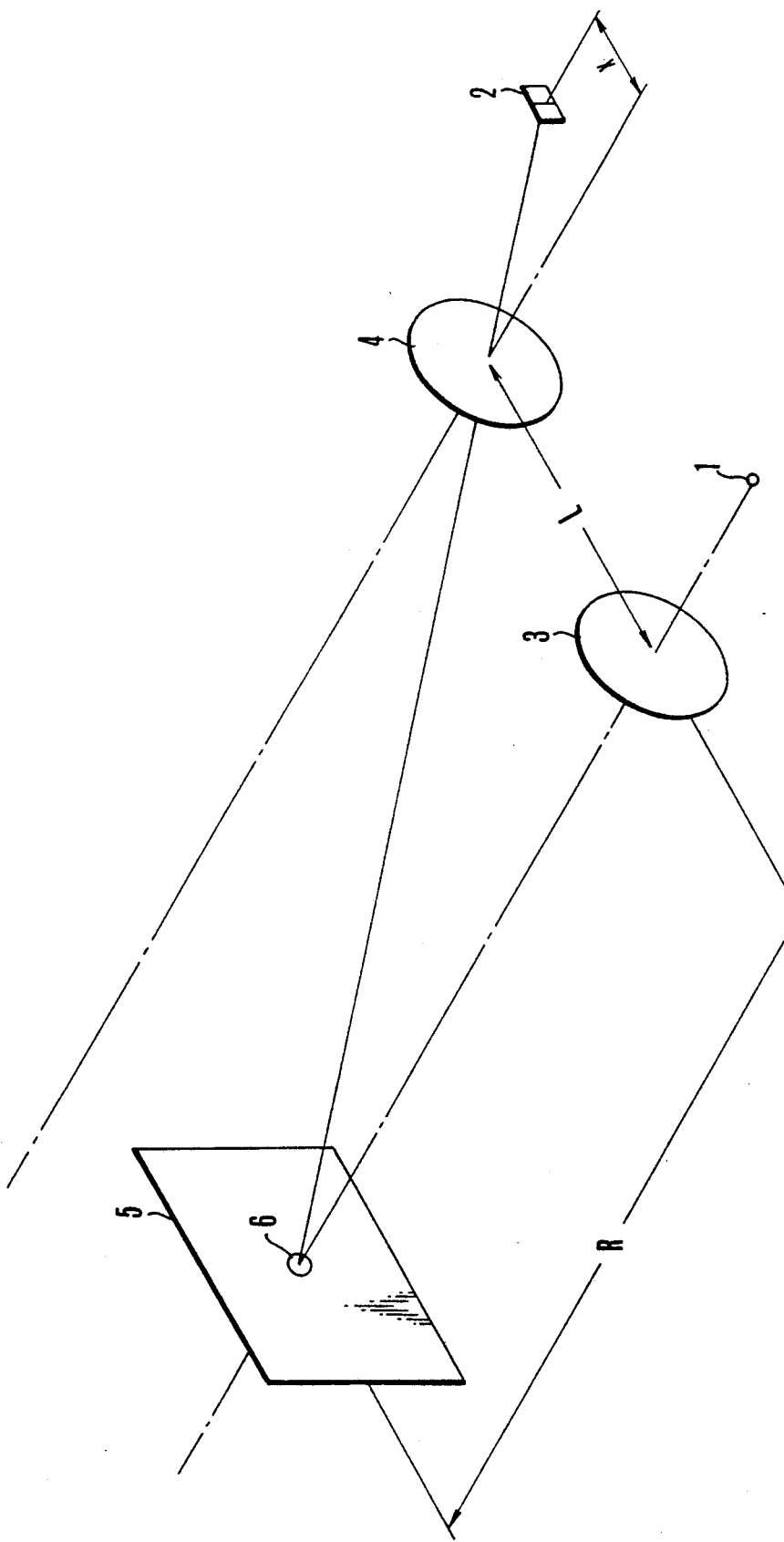
FIG. 7 is a layout view of the conventional distance measuring optical system.

FIG. 1 shows an arrangement in which a light projecting lens of a first embodiment of this invention is used. Referring to FIG. 1, a two-area light receiving sensor 2 is arranged to move perpendicularly to the optical axis of a light receiving lens 4 in synchronism with a focusing action on a photo-taking lens PL. The light receiving element 2 may be replaced with an element of a different type. The light receiving lens 4 may be arranged to be moved instead of moving the light receiving element 2. Further, instead of moving the light receiving element 2, the light emitting element 1 may be moved. The light emitting element 1 and the light receiving element 2 may be arranged to be moved in synchronism with each other.

An image detector ID is arranged to form an electrical signal by receiving an object image formed by the photo-taking lens PL.

FIGS. 2(A), 2(B) and 2(C) show a light projecting lens arranged as the first embodiment. FIG. 2(A) shows the shape of it as viewed from behind. FIG. 2(B) shows the side view of it. FIG. 2(C) shows it as viewed from above. The surface 10 on one side of the light projection lens is arranged to be in a spherical shape or in an aspherical shape with a convex spherical face used as a base face. The other surface of the light projection lens comprises two planes which jointly form a convex shape slanting respectively at an angle $\theta$ relative to a plane P which is perpendicular to an optical axis O. The boundary line between the two planes of the light projecting lens extends in the direction of the base-line length. Therefore, there are two optical axes. With the light projecting lens arranged as shown in FIG. 1, when the light emitting element 1 emits light, a beam of light passing through the upper half part of the light projecting lens 3' forms a projected light spot image 6-2 on the object 5. Another beam of light passing through the lower half part of the light projecting lens 3' forms another projected light spot image 6-1 on the object 5. The beams of reflected light of these two spot images 6-1 and 6-2 come through the light receiving lens 4 to form two spot images 7-1 and 7-2 on the light receiving element 2. The state of the spot images formed on the sensor, i.e., the light receiving element 2, is shown in FIG. 5. FIG. 6 shows, for comparison, the state of a spot image obtained on the sensor with the conventional light projecting lens used. In both cases, the outputs from the two areas A and B of the sensor are about equal to each other. The active type distance measuring device of the kind using a two-area sensor is arranged to finish its distance measuring action when a difference between the outputs of the A and B sensor areas comes to be less than a given value. Therefore, the resolution of the device on the light receiving element is determined by the area size of the spot image to be divided into two left and right parts by a center line. In other words, the resolution is determined by the diameter of the spot image formed on the sensor. The accuracy of the distance measurement is increased by a smaller spot diameter and decreased by a larger spot diameter.

With the device arranged as in the case of this embodiment shown in FIG. 1, the spot image on the sensor becomes the upper and lower spot images as shown in FIG. 5. The centers of the two spots are on the center line of the two-area sensor. Therefore, the distance measurement accuracy of the embodiment is equal to that of the conventional device if the spot diameters are the same as the spot diameter of the conventional device. In other words, with other conditions of the measuring optical system assumed to be the same as those of the conventional device, the focal length f1' of the light projecting lens of this embodiment can be arranged to be the same as the focal length f1 of the conventional light projecting lens for obtaining the same accuracy.

Further, if the two spot images on the sensor are arranged to be on the surface of the sensor as shown in FIG. 5, the reflected light from the object is completely receivable with a maximum efficiency. In one method for attaining this purpose, the device is arranged to meet conditions defined by the following formulas:

$$H - d > X$$

$$X = \frac{f_2}{R} \cdot Y$$

$$Y = \frac{R}{f1'} \cdot Z$$

$$Z \approx 2f1' \tan[\theta(n-1)]$$

wherein
H: the width of the sensor
d: the spot diameter on the sensor
X: a distance between centers of spots on the sensor
f1': the focal length of the light projecting lens
f2: the focal length of the light receiving lens
$\theta$: an angle between the planes of the light projecting lens and a plane perpendicular to the optical axis (prismatic apex angle)
Y: a distance between centers of spots on the object
R: the object distance
Z: a distance between the images of the infrared light source divided by the light projecting lens having a plurality of optical axes
n: refractive index of the prism part FIGS. 3(A), 3(B) and 3(C) show a light projecting lens arranged as a second embodiment of the invention. The surface of the light projecting lens on one side of it is either in a spherical shape or in an aspherical shape. The other surface is in a bi-prism shape which comprises two planes respectively slanting at an angle $\theta'$ relative to a plane perpendicular to the optical axis with a boundary line between them extending perpendicularly to the direction of the base-line length.

FIGS. 4(A), 4(B) and 4(C) show a light projecting lens arranged as a third embodiment of the invention. The light projecting lens of the third embodiment has the surface on one side thereof either in a spherical shape or in an aspherical shape. The other surface comprises two planes jointly forming a concave shape slanting at an angle $\theta''$ relative to a plane perpendicular to the optical axis. To divide the optical axis, a boundary line between the two planes extends in the direction of the base-line length.

In the foregoing, the light projecting lens has been described to have two optical axes formed by the two planes on one side of the lens. However, the same thing described in the foregoing applies also to a case where the same side is formed, for example, by three planes instead of two to give a plurality of optical axes. Further, while the distance measuring visual field is described as broadened in the vertical direction, the field of view is also laterally expandable by turning the whole optical system 90 degrees around the optical axis. This turning angle can be set as desired.

Each of the embodiments described is arranged to have a plurality of optical axes by tilting the planes of one side of the light projecting lens. This arrangement, however, may be changed to arrange, either in front or in the rear of the light projecting lens, a prism-like optical member which comprises a plurality of planes including one horizontal plane while others are slanting.

Further, in the case of embodiment described, the light receiving element is arranged to be scanned with the light source fixed in place. However, this arrangement may be changed either to scan the light source with the light receiving element fixed or to have both of them scanned. It is also possible to replace the light receiving element with an array of a plurality of sensors or with a position detecting sensor which is capable of performing position detection in an analog manner. The embodiment thus can be modified in varied manners. Further, a light receiving lens which is in the same shape as the light projecting lens can be used for the light receiving system. Such arrangement is applicable to an auxiliary illumination system of a passive type detecting device.

As described in the foregoing, one side of the light projecting lens comprises a plurality of planes to give a plurality of optical axes. This arrangement allows the lens itself to have a simpler shape than a fly-eye lens, etc. Therefore, in cases where the lens is manufactured by injection molding plastics or the like, the mold can be easily prepared.

What is claimed is:

1. An object detecting device comprising:
   a) a light emitting element arranged to produce a detection light;
   b) a light projecting lens arranged to project said detection light and provided with a plurality of planes on one side thereof, said plurality of planes being arranged to slant at an angle with respect to each other;
   c) a light receiving lens arranged to converge said detection light reflected from an object, said light receiving lens being disposed at a predetermined distance from said light projecting lens; and
   d) a light receiving element arranged to receive said converged detection light and to produce an electrical signal according to the distribution of intensity of light.

2. A device according to claim 1, wherein said light projecting lens has one surface thereof formed in a spherical shape or in an aspherical shape on the side of the object and the other surface formed to have the plurality of planes on the side of said light emitting element.

3. A device according to claim 2, wherein the plurality of planes of said light projecting lens slant at the same angle with respect to a plane which is orthogonal to a boundary between said lenses.

4. A device according to claim 3, wherein said plurality of planes form a concave shape.

5. A device according to claim 3, wherein said plurality of planes form a convex shape.

6. A device according to claim 2, wherein the plurality of planes of said light projecting lens have intersecting boundaries.

7. A device according to claim 1, wherein said light receiving element has adjoining light receiving areas.

8. A device according to claim 6, wherein said light receiving element is movable in a direction perpendicular to an optical axis of said light receiving lens.

9. An object distance measuring device comprising:
   a) light source providing means for providing a light source for a measuring light;
   b) light projecting lens means for projecting a pair of spots of said measuring light, said light projecting lens means having an optical axis, a spherical or aspherical lens surface and a prism part composed of planes a boundary between which is arranged on said optical axis;
   c) light receiving lens means for forming a pair of spots by converging said measuring light reflected from an object, said light receiving lens means being disposed at a predetermined distance from said light projecting lens means; and
   d) a sensor arranged to receive the pair of spots formed by said light receiving lens means and to produce an electrical signal according to the distribution of intensity of light, said device being arranged to satisfy the following conditions:

$$H - d > X$$

$$X = \frac{f2}{R} \cdot Y$$

$$Y = \frac{R}{f1'} \cdot Z$$

$$Z \approx 2f1' \tan[\theta(n-1)]$$

wherein,
H: the width of said sensor
d: the diameter of the spots on said sensor
X: a distance between centers of the spots of said sensor
f1': the focal length of said light projecting lens means
f2: the focal length of said light receiving lens means
$\theta$: an angle at which the planes of said light projecting lens means slant relative to a plane perpendicular to said optical axis
Y: a distance between centers of the spots on the object
R: a predetermined object distance
Z: a distance between images of the light source divided by said light projecting lens means having a plurality of optical axes
n: the refractive index of said prism part.

10. A device according to claim 9, wherein said sensor is arranged to have adjoining light receiving areas, and is optically movable in a direction perpendicular to an optical axis of said light receiving lens means.

* * * * *

UNITED STATES PATENT AND TRADEMARK OFFICE
CERTIFICATE OF CORRECTION

PATENT NO. : 5,109,161
DATED : April 28, 1992
INVENTOR(S) : AKIHISA HORIUCHI, ET AL.

It is certified that error appears in the above-identified patent and that said Letters Patent is hereby corrected as shown below:

COLUMN 1

Line 53, "diagramati-" should read --diagrammati--.

COLUMN 2

Line 12, "$R = L \cdot f_2/x$" should read --$R = L \cdot F2/X$--.

Line 28, "of" should be deleted.

COLUMN 4

Line 1, "$X = \frac{f^2}{R} . Y$" should read --$X = \frac{F2}{R} . Y$--

COLUMN 6

Line 26, "$X = \frac{f^2}{R} . Y$" should read --$X = \frac{F2}{R} . Y$--

Signed and Sealed this

Seventeenth Day of August, 1993

Attest:

BRUCE LEHMAN

*Attesting Officer*  *Commissioner of Patents and Trademarks*